United States Patent [19]
Smith

[11] Patent Number: 5,400,326
[45] Date of Patent: Mar. 21, 1995

[54] NETWORK BRIDGE

[75] Inventor: David D. Smith, Raleigh, N.C.

[73] Assignee: International Business Machines Corporation, Armonk, N.Y.

[21] Appl. No.: 178,373

[22] Filed: Dec. 22, 1993

[51] Int. Cl.6 .............................................. H04L 12/54
[52] U.S. Cl. .................... 370/61; 370/85.13
[58] Field of Search ............... 370/58.3, 60, 61, 85.13, 370/85.14, 108

[56] References Cited

U.S. PATENT DOCUMENTS

| | | | |
|---|---|---|---|
| 5,136,580 | 8/1992 | Videlock et al. | 370/61 |
| 5,229,994 | 6/1993 | Balzano | 370/85.13 |
| 5,305,319 | 4/1994 | Sowell | 370/85.13 |
| 5,307,345 | 4/1994 | Lozowick et al. | 370/461 |

Primary Examiner—Benedict V. Safourek
Attorney, Agent, or Firm—Stephen T. Keohane; John B. Frisone

[57] ABSTRACT

A bridge for interconnecting data networks includes an adapter connected to each network and a central programmed processor. Each adapter includes a receive and a transmit FIFO storage which is less than the packets being transferred from one network to the other. The control program generates Receive Buffer Descriptors which include buffer pointers, buffer length fields and pointers to next descriptors. These Descriptors are used by the adapters to buffer received packets which are directed to another network. When a packet is buffered the control program generates Transmission Descriptors which are used by the adapter to transfer packet data to the other network. The control program modifies packet when needed by by generating and storing in its memory only the modified portion and including in the Receive Buffer Descriptor pointers which the buffered information which is to be transmitted and the sequence.

6 Claims, 6 Drawing Sheets

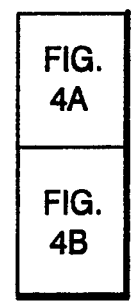
FIG. 4
FIG. 4A
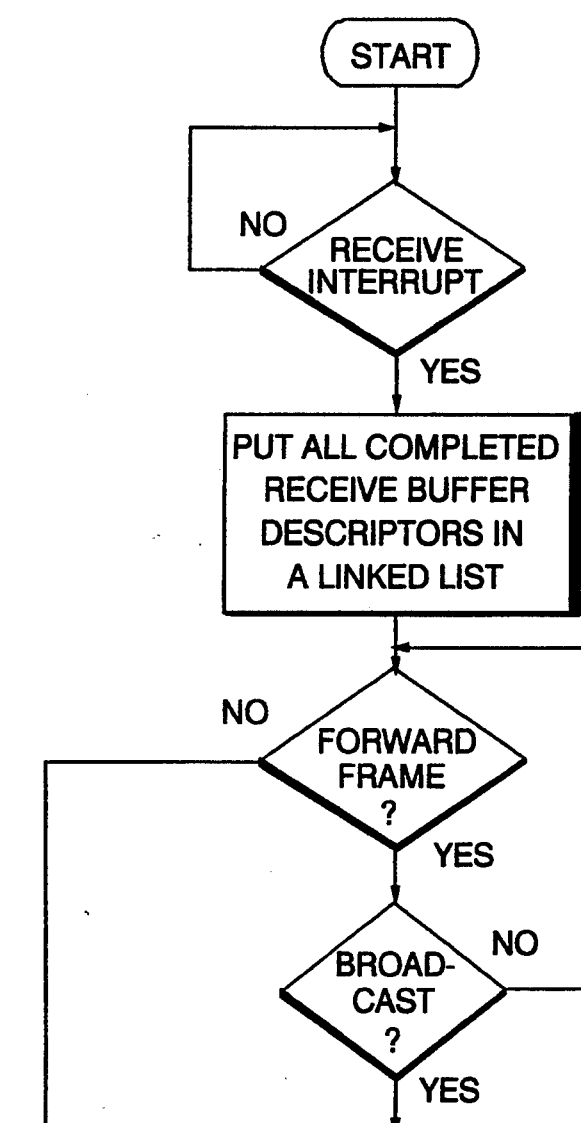

ic routing field which if present indicates the packet is to be routed to another network.

NETWORK BRIDGE

FIELD OF THE INVENTION

This invention relates to interconnecting digital data communication networks and more particularly to frame or packet forwarding via a bridge interconnecting two or more independent networks.

BACKGROUND OF THE INVENTION

Traditional digital networks have been characterized as synchronous or store and forward. Synchronous networks are used primarily for carrying voice signals which must be delivered at the destination in a synchronous manner and without undue delay. Variation in the delivery rate of samples will result in distortion of the recreated voice signal and extended end to end delays in the delivery are unacceptable from a human factors point of view. Store and forward or packet networks have been used primarily for transporting business data (files, credit queries, etc.) none of which are impacted by end to end delays normally encountered in these networks. Packet networks are more efficient in the utilization of network band width since they can take advantage of statistical utilization and loading factors. For example, a synchronous network carrying a voice conversation must allocate resources even when there is no meaningful signal present. TASI (Time Assigned Speech Interpolation) has increased utilization of these facilities, however, utilization has not approached the efficiency of a pure packet network.

With the availability of high speed digital networks (100 megabits/sec and above), it is possible to employ packet networks to carry synchronous signals such as digitized voice without experiencing the difficulties set forth above. However, as the number of independent networks (and bridges interconnecting them) increases, the end to end delay increases. This increase is a direct result of the processing time required to pass from one network to another through a bridge interconnecting them. A primary object of the invention disclosed herein is to reduce the processing time required to transfer a packet from one network to another thus decreasing the end to end delay in transmissions extending over a large number of networks interconnected by bridges. In so doing extending the distance or domain over which synchronous traffic can flow in packet form.

SUMMARY OF THE INVENTION

The invention contemplates a bridge for receiving data packets from a first network and transmitting them on to a second network. Said bridge comprising, a first adapter connected to the first network for receiving and examining at least a portion of the packet to determine if the packet is to be transferred to the second network. A processor including a control program and a memory for storing at least one complete packet. Said control program generating at least one Receive Buffer Descriptor which includes a pointer and length value which define a buffer in the memory for storing a packet which is to be transmitted on another network and a pointer to a next Receive Buffer Descriptor, if provided, which pointer may be used if the packet in process exceeds the the length of the buffer defined in the first Receive Buffer Descriptor.

Means in the first adapter for accessing a Receive Buffer Descriptor when it has a packet to transfer and for loading the packet into the memory buffer defined in the descriptor and notifying the processor and its control program when the packet has been stored. The control program examines the contents of the buffer and generates a Transmit Descriptor which includes at lest one pointer and a length field and if provided a pointer to another Transmit Descriptor if more than one buffer is queued for transmission.

A second adapter connected to the said other network and responsive to the said at least one Transmit Descriptor for transmitting the packet stored in the buffer defined in the Transmit Descriptor.

BRIEF DESCRIPTION OF THE DRAWINGS

FIG. 4, 4A, and 4B are flow charts illustrating the function of the program in the system unit shown in FIG. 2.

DESCRIPTION OF THE PREFERRED EMBODIMENT

Figure 1:
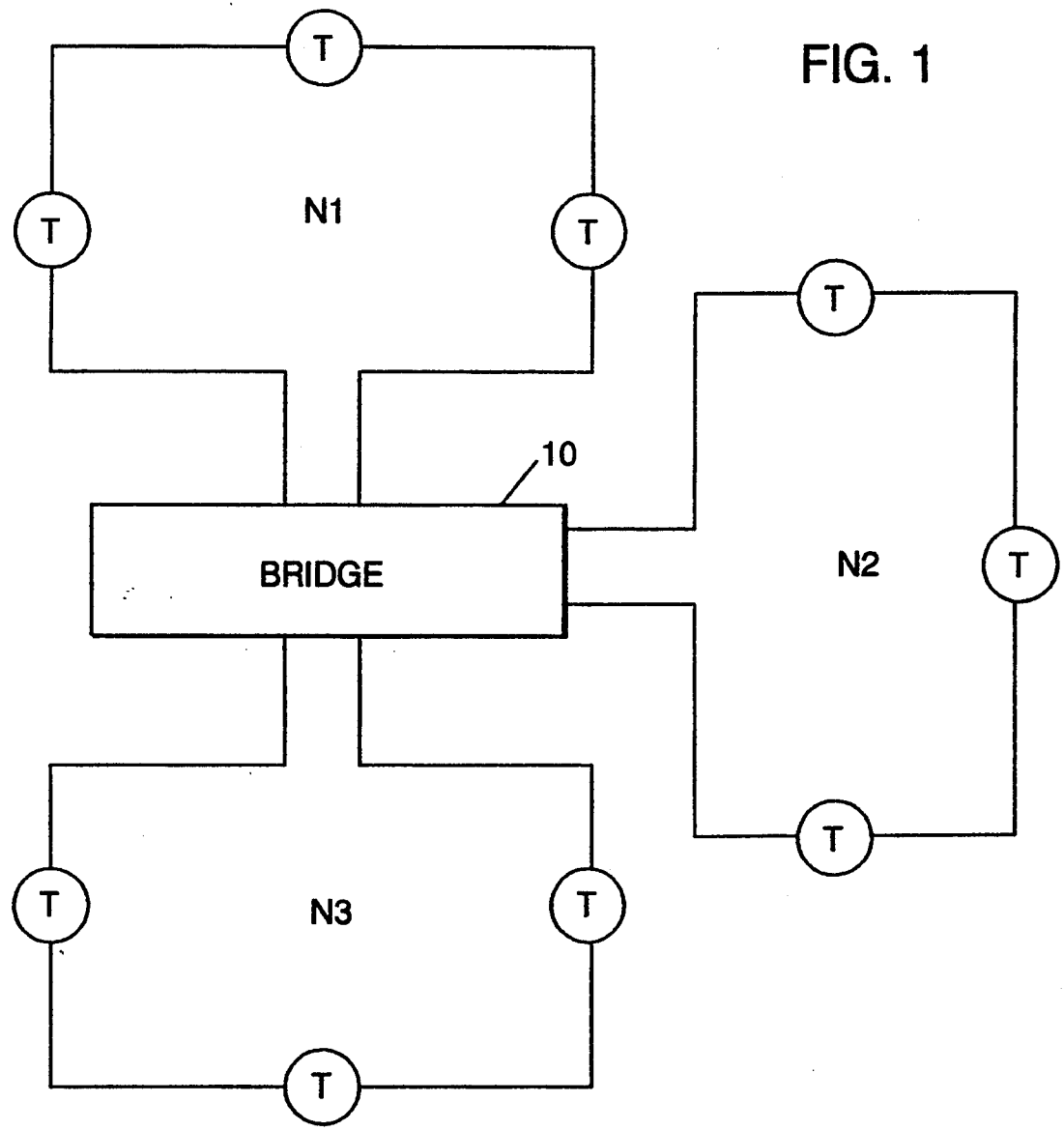
FIG. 1 is a block diagram of a plurality of networks interconnected by a bridge constructed in accordance with the invention.

In FIG. 1, a first network N1, a second network N2 and a third network N3 are interconnected by a bridge 10, each of the networks includes a number of terminals T (either synchronous or asynchronous) which may communicate with each other regardless of which network they are located in. In the interest of simplicity all of the networks are illustrated as token ring networks, however, networks having different protocols can be interconnected in the same manner only requiring an additional step of well known protocol conversion using the same technique of packet modification as described herein below.

Figure 2:
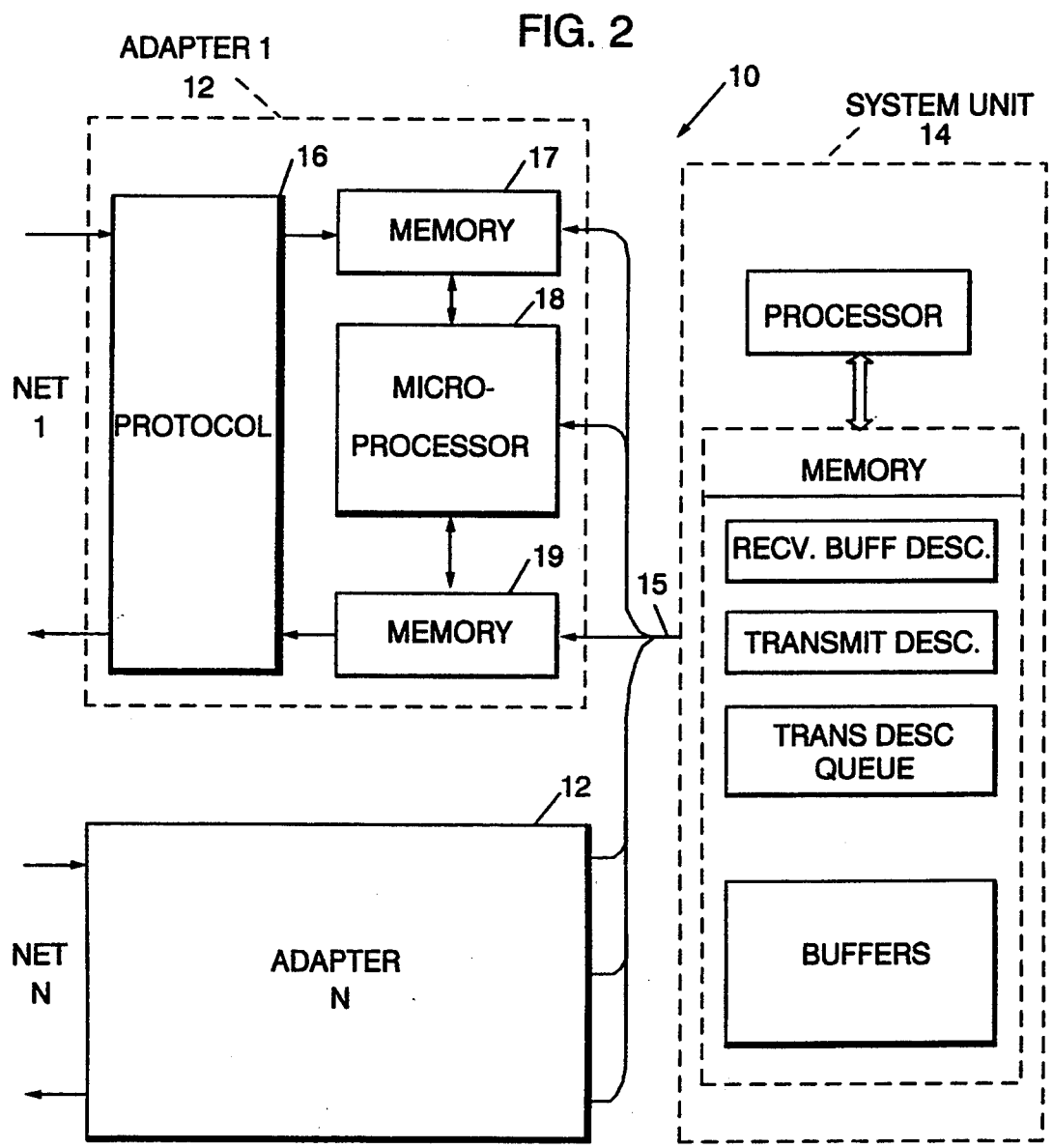
FIG. 2 is a block diagram of the bridge illustrated in FIG. 1.

The bridge 10 illustrated in FIG. 2 includes n adapters 12, each connected to one of n networks. In the described system it will be assumed that all the networks are token ring networks. As pointed out above this need not be the case since the invention will be applicable in those instances where different networks are interconnected. A central system unit 14 is connected to all the adapters 12 by a system buss 15.

Each adapter includes protocol specific circuits 16 for terminating and driving the network as well as other protocol functions specified for the network. In the case of the token ring network these are all spelled out in the IEEE 802.5 specification and need not be further discussed herein. A copy of the data stream is applied to a memory 17 which has a limited storage capacity, however sufficient to store such information which would indicate when a packet is to be transmitted on another network. In the case of the token ring this would be the physical header including the optional routing information field. In those instances where transparent routing is employed sufficient memory need only accommodate destination and/or source address fields which when compared to a stored routing table indicate if and where packets are to be routed.

A programmed micro processor 18 monitors the contents of memory 17 looking for a start delimiter as defined in the token ring standard and thereafter the routing information field to determine based on the content if the frame or packet is to be transmitted on another network. If the packet is not to be transferred the micro processor resumes looking for the next start delimiter and repeats the process.

If the routing information in the header indicates that the message is for a device on another network the micro processor transfers the entire packet to a buffer in the system unit 14. The only delay introduced is that imposed by the memory 17 and circuit operation time which is very small. The system unit 14 is provided with a control program which generates a number of Receive Buffer Descriptors. Each descriptor includes the starting address of a buffer, the length of the buffer, the address of a next Receive Buffer Descriptor and status information which is inserted when an adapter uses the Descriptor to process a frame directed to another network. For example, status information in a Descriptor may identify a buffer which stores a complete frame, the beginning of a frame, the middle of a frame or the end of a frame. Since the packets in the token ring network can vary considerably in length the use of a string of Receive Buffer Descriptors which allow chaining of small buffers results in a more efficient utilization of memory thus accommodating a wide range of buffer requirements without reserving large buffer spaces.

When the adapter micro processor recognizes a need to transfer a packet to another network, it requests a Receive Buffer Descriptor from the system control program. Upon receipt of the descriptor it starts to transfer the contents of memory 17 into the buffer space defined by the starting address and the length field in the descriptor. While this transfer takes place the adapter continues to receive the incoming packet into memory 17 which acts as a fixed delay line as described above. If the packet is long enough to exhaust the buffer space defined in the first descriptor, the micro processor updates the status and uses the next descriptor address supplied with the first descriptor to obtain additional buffer space for longer messages. When the micro processor detects the end delimiter and the following frame status field in the packet it updates the status in the Descriptor and signals the system control program that a complete packet has been received with an End Of Frame message. At this time the system control program processes the packet. In accordance with the token ring standard the system control program may need to modify the routing information field and recompute the frame check sequence field. Normally, this would involve recreating a new copy of the packet in the memory of the system unit before retransmitting on the next network, thus introducing additional delays.

According to the invention the control program places a copy of the modified routing field and the recomputed frame check sequence field in the system memory and thereafter generates a Transmit Descriptor which includes a first pointer defining the starting address of the first buffer of the packet and a first length field which encompasses all of the packet data up to the now invalid routing information. A second pointer and length field defining the location and length of the modified routing information field. Additional pointers and length fields as required starting after the now invalid routing information field to take into account longer packets using more than one buffer. The penultimate pointer and length field identifies the recomputed frame check sequence number while the last pointer and length field in the Transmit Descriptor returns to the end delimiter and frame status field, the last two fields in the message as received from the network. As the Transmit Descriptors for an adapter 12 are generated by the system control program they are added to a transmit queue for that adapter.

The micro processor 18 in the adapters request Transmit Descriptors from their Queue and transfer data from the system memory using the pointers and lengths fields contained in the Transmit Descriptor. The packet data taken from the system unit memory passes through a memory 19 in the adapter 12. The memory 19 in adapter 12 is useful in preventing underrun errors from occurring when a number of adapters are simultaneously accessing the system unit 14 memory.

Figure 3:
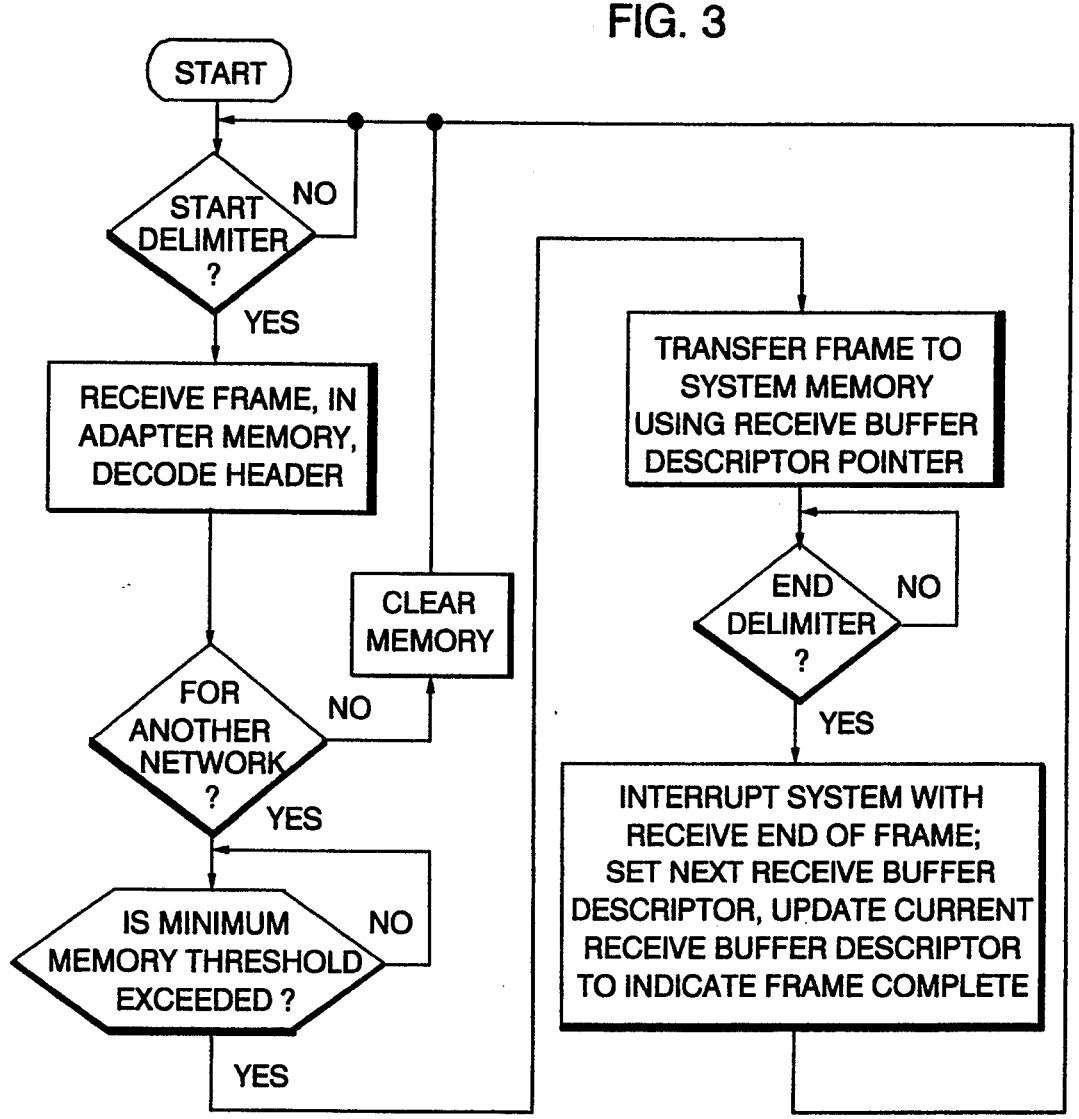
FIG. 3 is a flow chart illustrating the receiving functions performed in an adapter shown in FIG. 2.

FIG. 3 is flowchart illustrating the operation which takes place in the adapter when a frame is received. The program loops looking for a start delimiter which defines the beginning of every frame. If a start delimiter is detected the frame is received in the adapter memory and the header is examined to determine if the frame is for another network. If it is not, the memory is cleared and the search for a start delimiter is resumed. If it is for another network receiving continues. When a minimum amount has been received transfer to the system memory begins. The storage buffer is defined in the Receive Buffer Descriptor previously prepared by the system control program at initialization and provided to the adapter. As described above the Receive Buffer Descriptors include the beginning address of the data buffer, the length, a pointer to the next Descriptor and a status field. When the program detects an End Delimiter which marks the end of the frame it updates the current Receive Buffer Descriptor status field to indicate that the identified buffer includes an End Delimiter, interrupts the system with an End Of Frame and gets the next Receive Buffer Descriptor in order to process the next frame destined for another network.

Figure 4B:
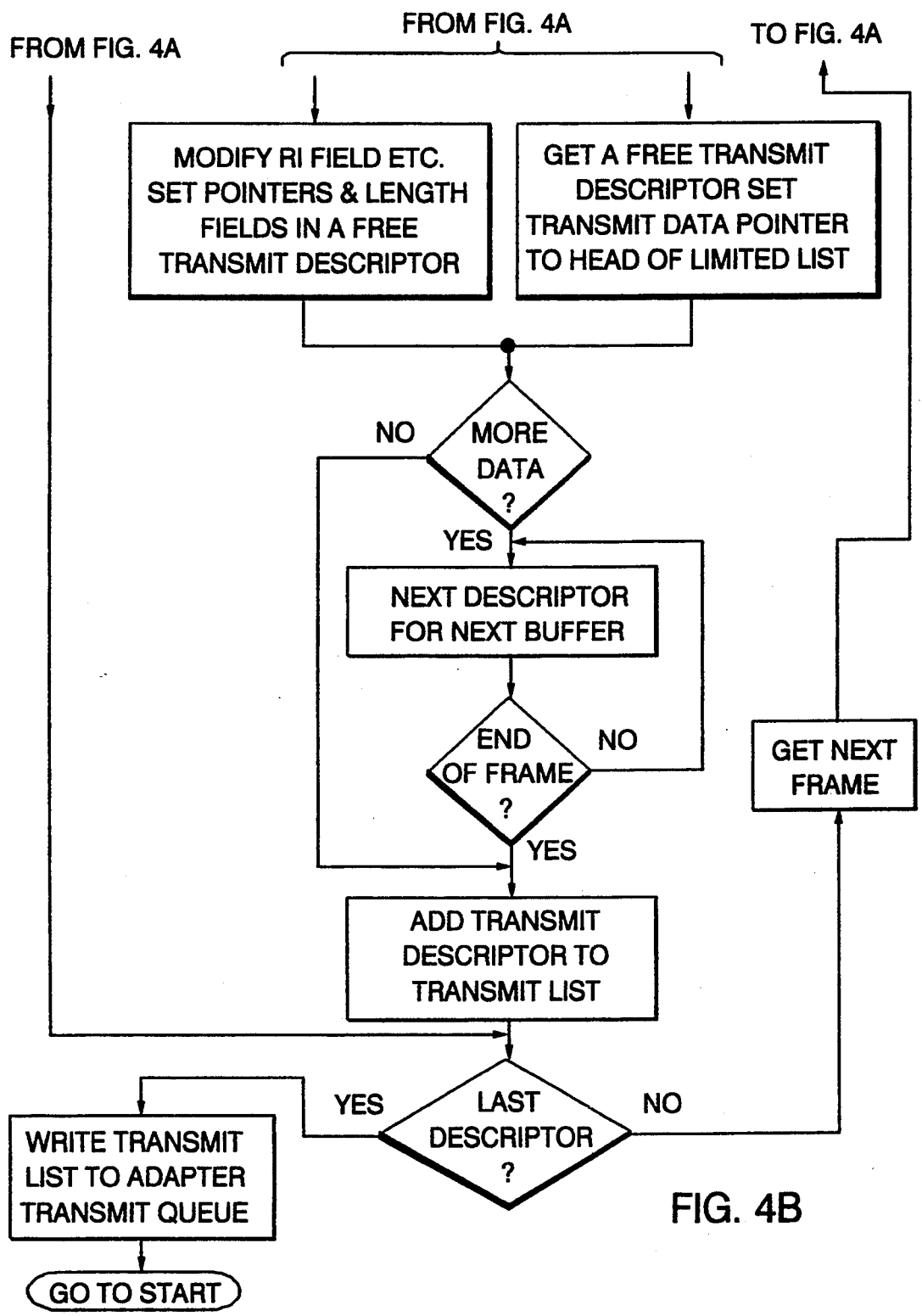

FIG. 4 is a flow diagram illustrating the operation of the program in the system unit 14. The program looks for the End Of Frame indication from the adapter. When this is detected, all the Receive Buffer Descriptors are placed in a linked list. The frame is examined to determine validity and then examined to determine if it is a broadcast frame. If the frame is not a broadcast frame no alteration of the frame takes place and the program obtains a free Transmit Descriptor. It sets the Transmit Data Pointer 0 to the head of the linked list. If on the other hand the frame is a broadcast frame, the program makes a copy of the modified Routing Information field in working memory and any other fields which are changed and inserts pointers and length fields in a free Transmit Descriptor.

It checks to see if there is more data and accesses that data via the next Receive Buffer Descriptor in the list. It checks for end of frame status and when detected it adds the Transmit Descriptor to a Transmit List for the adapter. If this is the last Transmit Descriptor it writes the Transmit List to the adapter Transmit Queue. If it is not the last Transmit Descriptor loops back to process more Receive Buffer Descriptors.

Figure 5:
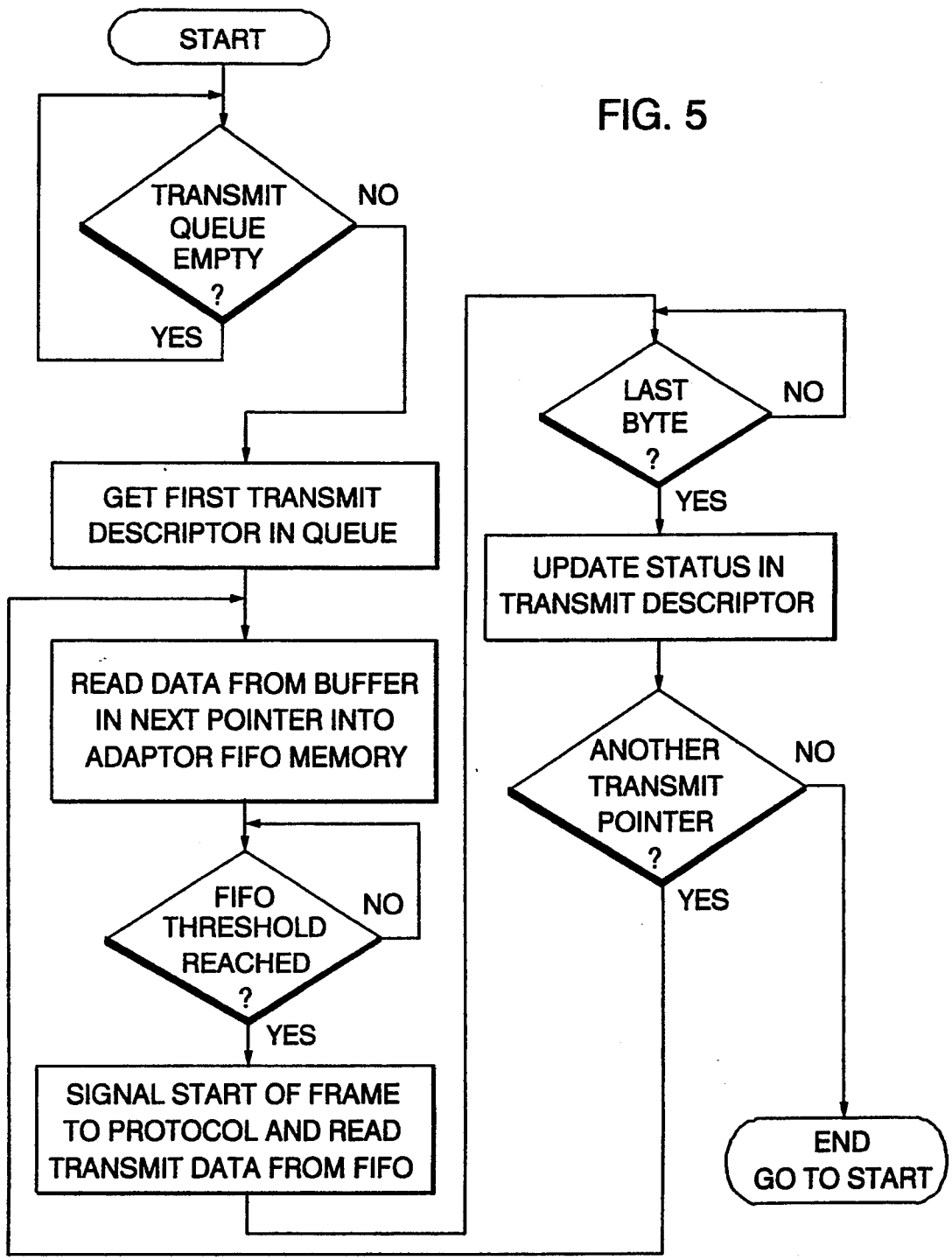
FIG. 5 is a flow chart illustrating the transmit functions performed in an adapter shown in FIG. 2.

FIG. 5 is a flow chart of the transmit program in the adapter. The adapter transmit program examines the Transmit Queue. When the Queue is not empty the program gets the first Transmit Descriptor in the Queue. As described the Transmit Descriptor includes one or more pointers defining data buffers which store the frame to be transmitted. It reads the data from the first buffer into the adapter FIFO transmit memory 19.

When the FIFO memory 19 reaches a threshold the program signals the start of frame to the protocol 16 and reads transmit data from FIFO 19. When the last byte in a buffer is read into memory, the Transmit Descriptor status is updated and the program determines if another pointer is in the Transmit Descriptor. If another pointer is included the process loops back and processes the buffered data associated with that pointer. If no other pointer associated with this Transmission Descriptor exists the program loops back and examines the Transmit Queue as described above. While a single embodiment of the invention has been described in detail it will be obvious to those skilled in this art that changes and modifications can be made without departing from the spirit and scope of the invention.

I claim:

1. A bridge for receiving data packets from a first communication network and transmitting them on to a second communication network comprising:
   a first adapter connected to the first network for receiving, storing and examining at least a portion of a received packet to determine if the packet is to be transferred to the second network;
   a processor including a control program and a memory for storing at least one Receive Buffer Descriptor which includes a pointer and a length value which defines a buffer in the memory for storing a packet which is to be transferred from one network to another network;
   means in the first adapter for accessing a Receive Buffer Descriptor when it identifies a packet requiring transfer and for initiating transfer of the packet from the first adapter store into the memory buffer defined in the descriptor and for notifying the processor and its control program when a complete packet has been transferred to and stored in the processor memory;
   means in the control program for examining the contents of the buffer and generating a Transmit Descriptor which includes at least one pointer and a length field defining the buffer; and,
   a second adapter connected to the said other network and responsive to the said at least one Transmit Descriptor for transmitting the packet stored in the buffer defined in the Transmit Descriptor.

2. A bridge as set forth in claim 1 in which the said control program generates a plurality of said Receive Buffer Descriptors and each includes a second pointer which points to a next Receive Buffer Descriptor to provide a chain of Received Buffer Descriptors to buffer packets of variable length in an efficient manner and said Transmit Descriptors include a pointer to the buffer defined in each Receive Buffer Descriptor used to buffer a received packet.

3. A bridge as set forth in either claim 1 or claim 2 in which the said control program modifies the contents of a packet stored in the processor memory by creating and storing in the processor memory only the altered portions of the packet and generating one or more pointers for inclusion in a Transmit Descriptor for identifying valid stored information and the altered information and the transmission sequence thereof.

4. A bridge as set forth in either claim 1 or claim 2 in which the storage in the first adapter is less than a full packet and all received data in the packet passes through the storage on a first in first out (FIFO) basis and transfer to the processor memory buffer starts after a storage threshold is reached.

5. A bridge as set forth in either claim 1 or claim 2 in which the said second adapter is provided with a storage which is less than the length of a packet and buffered packet data is passed on a first in first out (FIFO) basis through the storage, and transmission of packet data on the other network is delayed until packet data stored in the second adapter storage reaches a predetermined threshold.

6. A method for transferring packets of information from a first network to a second network through a bridge which includes an information store and a control program for executing the method which includes the following steps:
   storing packets from one network requiring delivery to the other network in the information store;
   examining the stored packets to determine if a packet requires modification;
   generating the required modification and storing it in another location in the information store;
   generating at least one transmit descriptor which includes at least one set of pointers which define the location in the store of valid packet information, the generated modification and the sequence in which they are to be transmitted; and,
   transmitting the contents of the store identified by the said at least one transmit descriptor onto the said other network.

* * * * *